US008015268B2

(12) United States Patent  
Duffy et al.

(10) Patent No.: US 8,015,268 B2
(45) Date of Patent: Sep. 6, 2011

(54) METHODS, SYSTEMS, AND COMPUTER READABLE MEDIA FOR SYNCHRONIZING DEVICE STATE

(75) Inventors: Mark Duffy, Lexington, MA (US); Ephraim Ezekiel, Newton, MA (US); Robin Iddon, Edinburgh (GB); Eric Schott, Londonderry, NH (US); Aruna Thirumalai, Woburn, MA (US); Chris Cook, Pepperell, MA (US)

(73) Assignee: Genband US LLC, Plano, TX (US)

( * ) Notice: Subject to any disclaimer, the term of this patent is extended or adjusted under 35 U.S.C. 154(b) by 848 days.

(21) Appl. No.: 11/364,018

(22) Filed: Feb. 27, 2006

(65) Prior Publication Data

US 2006/0200793 A1 Sep. 7, 2006

Related U.S. Application Data

(63) Continuation of application No. 10/102,169, filed on Mar. 20, 2002, now abandoned.

(51) Int. Cl.
*G06F 15/177* (2006.01)

(52) U.S. Cl. ........ 709/220; 709/230; 709/225; 709/226; 709/217; 709/238; 709/218; 709/219; 370/359; 370/366; 370/102; 370/100; 370/254; 707/201; 707/10; 707/204; 707/200; 707/202

(58) Field of Classification Search .............. 707/201, 707/10, 204, 200, 202; 709/220, 230, 225, 709/226, 238, 217–219, 223; 370/359, 366, 370/102, 100, 254

See application file for complete search history.

(56) References Cited

U.S. PATENT DOCUMENTS

| 6,047,004 | A | 4/2000 | Koyama ...................... 370/509 |
|---|---|---|---|
| 6,088,704 | A | 7/2000 | Aiba ............................ 707/200 |
| 6,101,497 | A * | 8/2000 | Ofek ............................. 707/10 |
| 6,487,560 | B1 * | 11/2002 | LaRue et al. ................. 707/203 |
| 6,493,727 | B1 * | 12/2002 | Huang et al. ................. 707/201 |
| 6,502,205 | B1 * | 12/2002 | Yanai et al. .................... 714/7 |
| 6,725,281 | B1 | 4/2004 | Zintel et al. .................. 719/318 |
| 6,920,491 | B2 * | 7/2005 | Kim ............................ 709/220 |
| 6,976,087 | B1 * | 12/2005 | Westfall et al. .............. 709/238 |
| 7,280,996 | B2 * | 10/2007 | Hayakawa et al. ............ 707/1 |
| 2004/0024855 | A1 * | 2/2004 | Tsai et al. .................... 709/223 |

OTHER PUBLICATIONS

Notice of Abandonment for U.S. Appl. No. 10/102,169 (Apr. 19, 2007).
Official Action for U.S. Appl. No. 10/102,169 (Aug. 25, 2005).

* cited by examiner

*Primary Examiner* — Wing F Chan
*Assistant Examiner* — Benjamin M Thieu
(74) *Attorney, Agent, or Firm* — Jenkins, Wilson, Taylor & Hunt, P.A.

(57) ABSTRACT

A synchronization scheme is provided that includes querying a managed device to obtain an initial device state, synchronizing the device state in a plurality of management processes, detecting a change in the initial device state, and maintaining a synchronized current device state between the managed device and the plurality of management processes.

16 Claims, 5 Drawing Sheets

METHODS, SYSTEMS, AND COMPUTER READABLE MEDIA FOR SYNCHRONIZING DEVICE STATE

This application is a continuation of U.S. application Ser. No. 10/102,169, filed Mar. 20, 2002 now abandoned.

FIELD OF THE INVENTION

This invention relates to synchronization schemes.

BACKGROUND

Some electronic devices support device management interfaces that allow configuration, monitoring, and control of the devices. For example, users may directly interact with management interfaces through switches, menu, or command line interface. In other instances, software management programs interact with a management interface of the devices. In some cases, multiple users, either directly or via management programs, may simultaneously or alternately interact with the electronic devices.

SUMMARY

In an aspect, the invention features querying a managed device to obtain an initial device state, synchronizing the device state in a plurality of management processes, detecting a change in the device state, and maintaining a synchronized current device state between the managed device and the plurality of management processes.

Embodiments may include one or more of the following.

The plurality of management processes may reside in remote systems. Maintaining may include, for each management process, storing a current device state in the management processes. Storing may include integrating an incremental device state change into information stored in a management process.

Synchronizing may include determining whether synchronization already exists between a managed device and a management process, and establishing a synchronization if synchronization does not already exist.

Determining may include comparing a sequence number identifying a current device state with a previously stored sequence number.

Establishing may include a device-dominant process that includes modifying information stored in a management process to match a current state of the managed device.

Establishing may include a management process-dominant process that includes modifying a current state of the managed device to match information stored in one of the management processes.

In embodiments, detecting may include receiving a device state change message from a managed device. The change may be in response to a remote user command, a local user command and/or a command from one of the management processes.

In one embodiment, a computer program product, stored in a computer readable medium comprising instructions to cause a computer to query a managed device to obtain an initial device state, synchronize the device state in a plurality of management processes, detect a change in a device state, and maintain a synchronized current device state between the managed device and the plurality of management processes.

Embodiments may have any of the following advantages.

The method enables a management process to remain cognizant of the state of a managed device in the presence of management changes applied to the device by other management processes or users. The management process continues to possess up-to-date and synchronized information pertaining to a state of the device. This enables correct management of the device by the management process in the presence of the changes made by other management processes or users.

In the present method and system, management processes do not inadvertently overwrite changes to the device state made by other management processes or users.

Multiple management processes serve as redundant back-ups without requiring direct communication between each other. Each management process is made "aware" of changes to the device state via information and updates sent directly by the managed device itself to the management process. This eliminates software complexity that otherwise would result by a system lacking such features.

DETAILED DESCRIPTION

Figure 1:
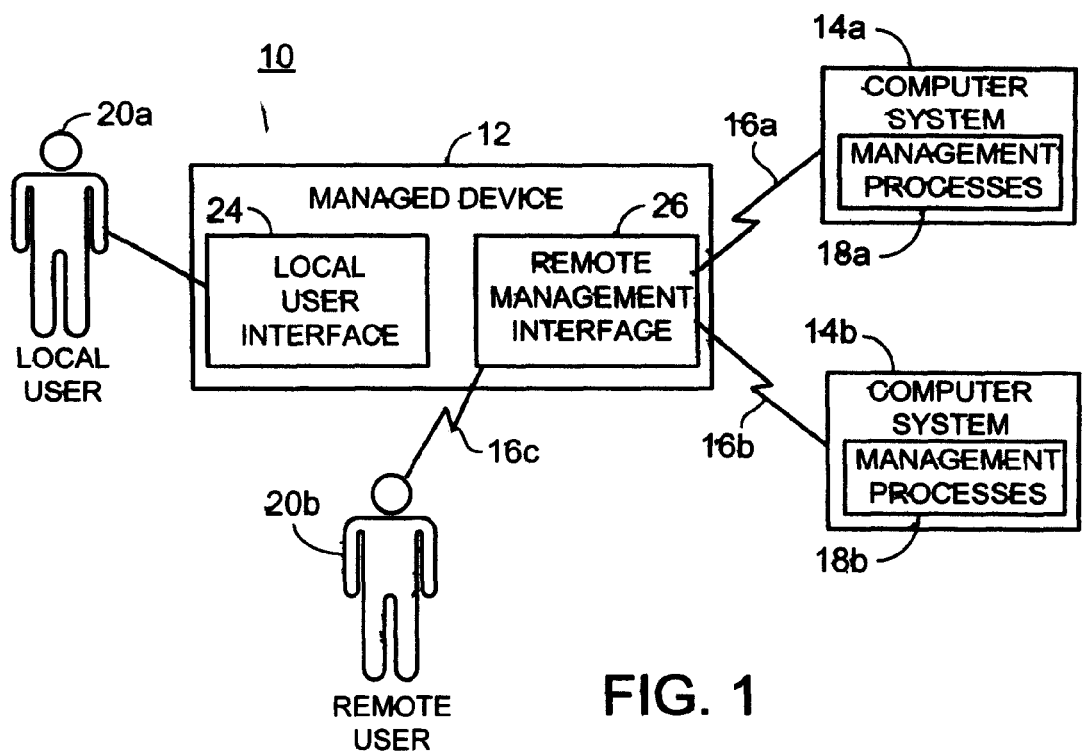
FIG. 1 is a block diagram of a system.

Referring to FIG. 1, a device synchronization system 10 includes a managed device 12, such as a network switch, connected to computer systems 14*a*-14*b* via communications channels 16*a*-16*b*. Management processes 18*a* and 18*b* reside in computer systems 14*a*, 14*b*, respectively and are programs that support configuration, control, and monitoring of the managed device 12.

In this example, a local user 20*a* and/or remote user 20*b* can also provide support and control for configuring, controlling, and monitoring the managed device 12. The users 20*a*, 20*b* can reset, configure, and input any information such as data commands into the managed device 12. The remote user 20*b* interacts with the managed device 12 via the communication channel 16*c* and the local user 20*a* interacts directly with the managed device 12 through a local user interface (UI) 24.

The user interface (UI) 24 may be a command line interface, a keyboard or mouse.

The remote user 20*b* and management processes 18*a*-18*b* interact with the managed device 12 via a remote management interface 26 linked to the communication channels 16*a*-16*c*.

Figure 2:
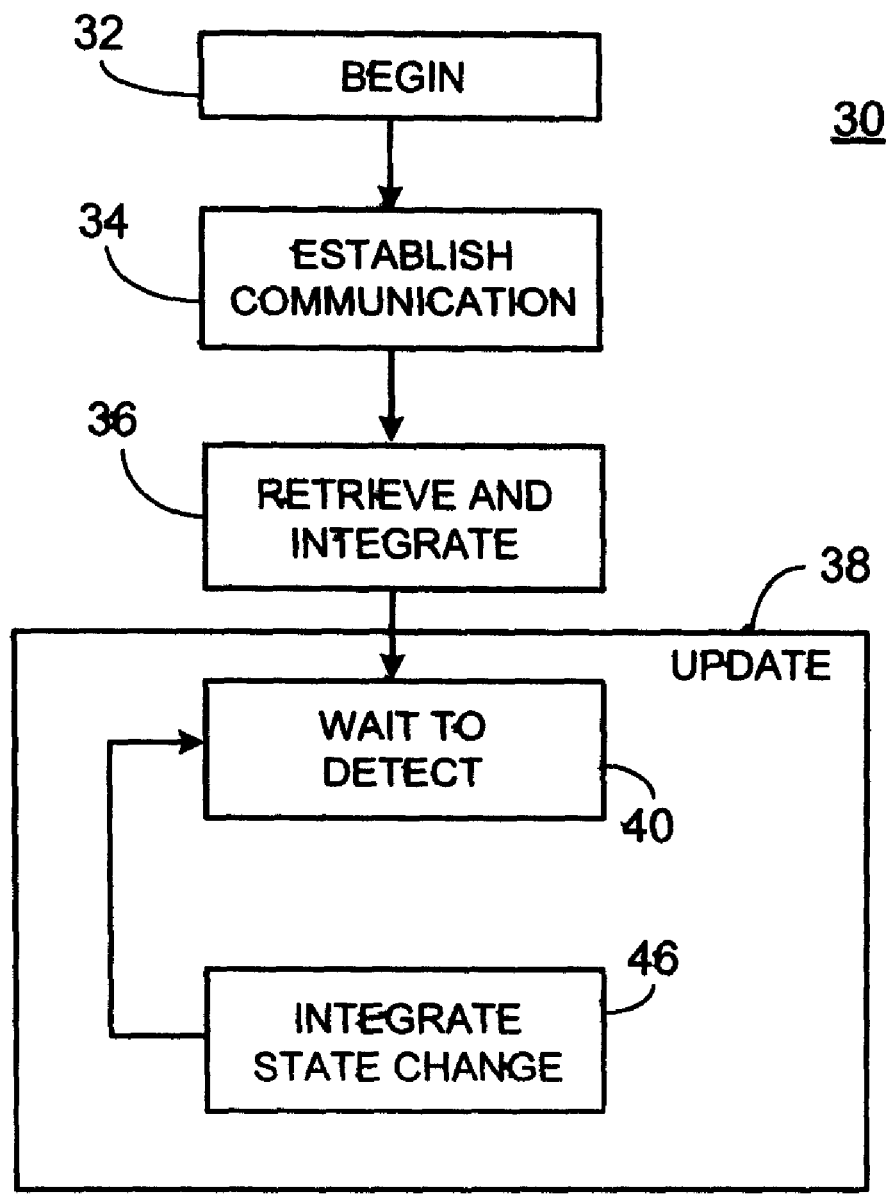
FIG. 2 is a flow diagram of a synchronization process.

Referring to FIG. 2, a synchronization process 30 residing in a management process 18 within the device synchronization system 10 features a feedback mechanism used to synchronize events such as configuration, set, reset, control, and monitoring events between the managed device 12 and the management processes 18*a*-18*b*. In particular, the process 30 begins (32) at a start phase by establishing communications (34) between the managed device 12 and each of the management processes 18. The synchronization process 30 is executed simultaneously and independently by any number of management processes 18*a*-18*b*, for example.

Once communication has been established, the process 30 retrieves and integrates (36) a full listing of current device state information. Device state information may include, for example, configuration information and control information.

The synchronization process 30 continues by updating (38) the device state information in the management processes 18*a*, 18*b*. In particular, during the updating (38), the management process 18 waits to detect (40) a device state change announcement from the device 12. For example, configuration and/or control information may change in the device 12. The announcement may be via, for example, a network message. The state changes in the device 12 may have arisen from the management process 18*a* itself or from any other source in the system 10, such as management process 18*b* or user 20. Once a device state change has been communicated, the management process 18*a*, for example, integrates the state changes (46) of the device 12 by process 30 into device state information residing in management process 18*a* within the computer system 14*a*. After the state changes are integrated (46), the process 30 waits (40) for a device state change.

Figure 3:
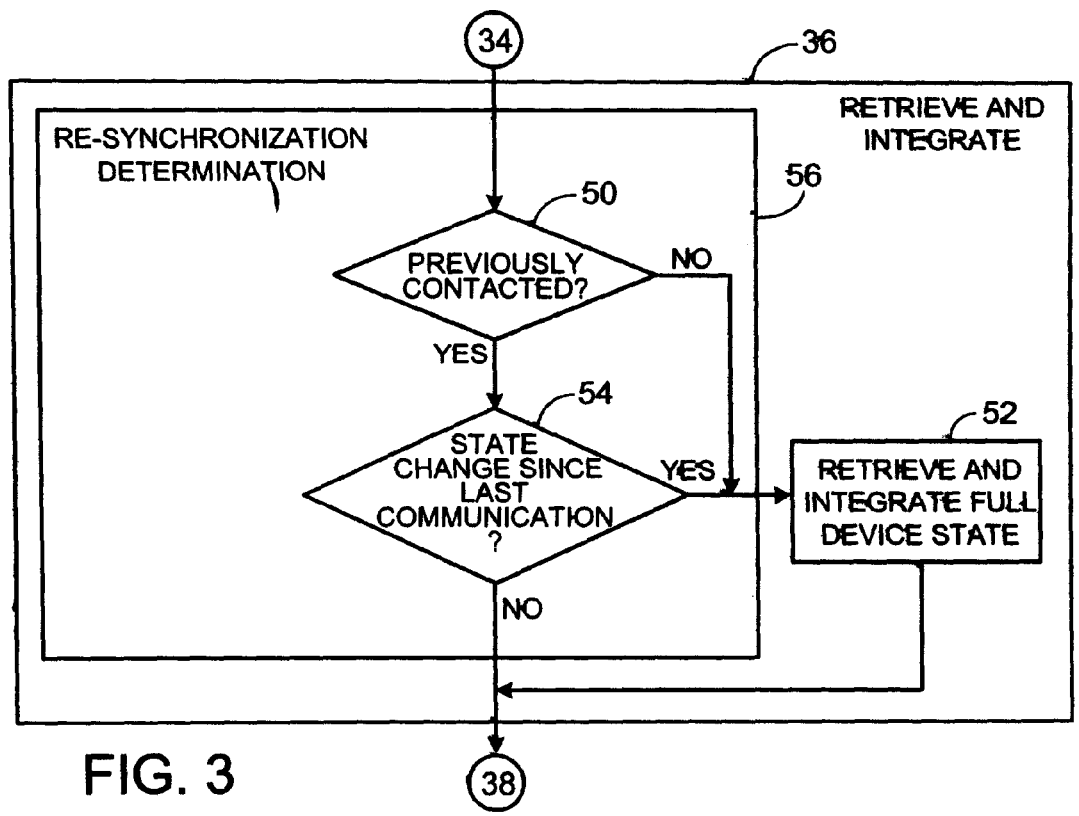
FIG. 3 is part of the flow diagram of FIG. 2.

Referring to FIG. 3, retrieving and integrating (36) full current device state information is optimized.

After communication has been established (34), the management process, for example, management process 18*a*, determines (50) whether this management process 18*a* has been in contact with the managed device 12 since the management process 18*a* has been started. If the management process 18*a* has not been in contact with the managed device 12 previously, the full current device state is retrieved and integrated (52) into device state information residing in management process 18*a* within the computer system 14*a*.

If the management process 18*a* has been in contact with the managed device 12, a determination (54) of whether the device state has changed since the last communication is made. If changes have occurred in the device state, then the full current device state is retrieved and integrated (52) into device state information residing in the management process 18*a*, as described above. This retrieval and integration (52) constitutes re-synchronization. If no changes have occurred in the device state, re-synchronization is suppressed and the process 30 continues (38) updating of the device state information in the management process 18*a*.

Together the process of determining (50) whether the management process 18*a* has been in contact with the device 12 since the management process 18*a* has been started and the process of determining (54) if the device state has changed since the last communication, make up a re-synchronization determination stage 56 where the management process 18*a* determines if re-synchronization with the device 12 will be needed.

The device 12 can maintain a sequence number on the device state and increment the sequence number each time the device state changes. The device 12 can be subject to state changes brought about by not only various management processes such as management processes 18*a*-18*b*, but users 20*a*, 20*b* can also directly subject device 12 to state changes, or state changes may occur not caused by management action.

The device state sequence number, when retrieved by the management process 18*a* and compared to a value stored previously, allows the management process 18*a* that has been out of contact with the device 12 to readily discover upon regaining connection with the device 12 whether the management process is still up-to-date with the current state of the device 12. This discovery constitutes the determination (54) of whether the device state has changed since the management process 18*a* last communicated with the device 12. In certain embodiments, further optimization can allow the management process 18*a* to retrieve only recent changes to the device state, rather than retrieving the entire current state.

Figure 4:
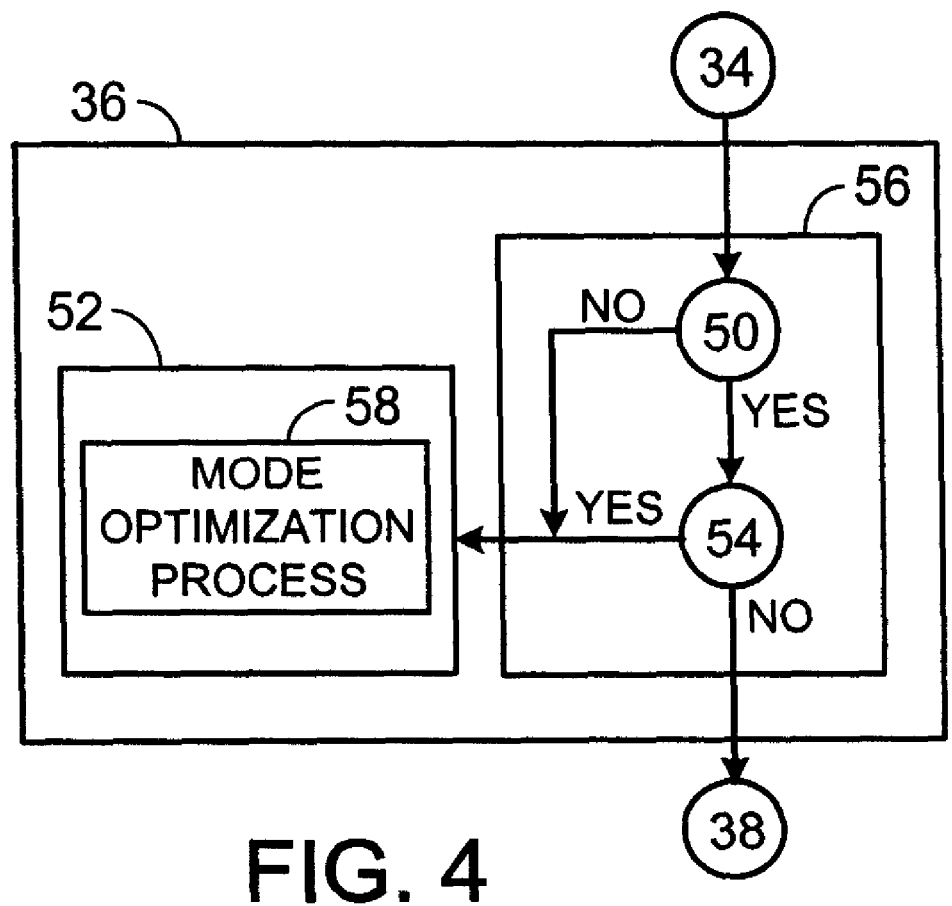
FIG. 4 is part of the diagram of FIG. 2.

Referring to FIG. 4, another optimization of the synchronization process 30 described above in conjunction with FIG. 3 is shown. After communication has been established (34) between the management process 18*a* and the device 12, the re-synchronization determination stage 56 as described above is executed. If re-synchronization is required (52), the management process 18*a* enters a mode optimization process (58). The mode optimization process (58) determines which of two re-synchronization modes, i.e., a device-dominant mode and a management process-dominant mode, was previously selected.

If the device-dominant mode was selected, the current state of the device 12 supercedes and overwrites any and all information held by the management process 18*a* should any conflict arise between the information exchanged between the device 12 and the management process 18*a*. Thus, the management process 18*a* retrieves and integrates the full current device state.

However, if the management process-dominant mode was selected, the opposite occurs, namely, the desired device state as stored in the management process 18*a* supercedes and overwrites any and all information held by the device 12. Thus, the management process 18*a* puts the device 12 to the desired state, for example, by retrieving the full current device state, computing the changes to the device state to match the device state to the state that has been stored in the management process 18*a* and then applying and forwarding those changes to the device 12.

If the re-synchronization determination stage 56 determines that re-synchronization is not required after communication has been established (34) between the management process 18*a* and the device 12, the synchronization process 30 continues updating (38) of the device state information in the management process 18*a*.

As described above in the synchronization process 30 in conjunction with FIGS. 2-4, if more than one management process is connected to the managed device 12 or if users 20 are also accessing the managed device 12 together with one or more management processes, the process 30 coordinates the various management processes that are modifying the device state. Further, whenever any relevant management operations are performed on the device 12, or other state changes of interest occur to the device 12, the device 12 reports this change to all management processes participating in the multi-way synchronization.

Figure 5:
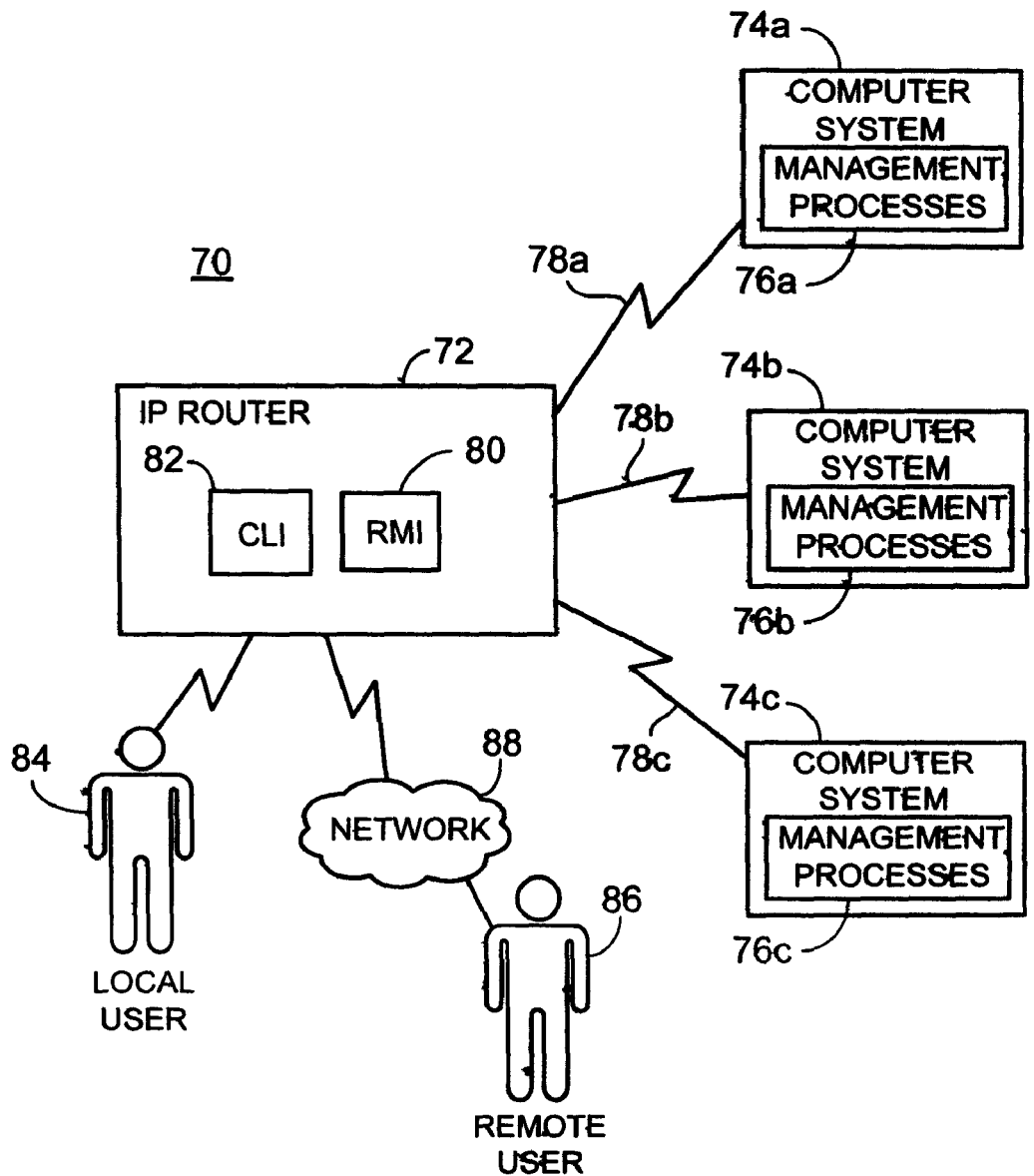
FIG. 5 is a diagram of a router synchronization system.

FIG. 5 illustrates an example of a managed device 12 in a router synchronization system 70 that includes a managed device 72 (e.g., an Internet Protocol (IP) router) and associated computer systems 74*a*-74*c* and management processes 76*a*-76*c* residing within the computer systems 74*a*-74*c*. In this example, the management processes 76*a*-76*b* employ the synchronization process 30. The management process 76*c* residing on computer system 74*c* does not participate in the synchronization process 30. A set of configuration parameters of the IP router device 72 constitutes device state information. The management processes 76*a*-76*c* are coupled to the IP router device 72 via communications channels 78*a*-78*c*, respectively, that link the management processes 76*a*-76*c* with the remote management interface 80.

The IP router device 72 supports a command line interface (CLI) 82 that may be accessed locally by the user 84, or remotely over a network 88 (e.g., the Internet) using, for example, the telnet protocol by remote user 86. The users 84 and 86 as well as the management processes 76*a*-76*c* manipulate the IP router device 72 state, such as router configuration state, by issuing commands to the IP router 72.

In support of the synchronization provided by the synchronization system 70, the IP router device 72 provides a mechanism for determining whether the IP router 72 configuration state has changed, based on a sequence number assigned by the IP router device 72 to each version of that state. The management processes 76*a*-76*b* use that sequence number to determine whether a device state has changed since the last communication between the management processes 76a-76b and the IP router device 72.

The management processes 76a-76b can also retrieve the full current IP router device 72 configuration state. Additionally, if a relevant management operation is performed on the IP router device 72, or other state change of interest occurs in the IP router device 72, the IP router device 72 reports the change to all management process instances 76a-76b participating in the multi-way synchronization.

Application of the synchronization system 70 enables the management processes 76a-76b to correctly and robustly manage the IP router device 72 even in the presence of direct management actions taken by local user 84 or remote user 86 at the CLI interface 82 of the IP router device 72, management actions taken by other management process 76c not participating in the synchronization process 30, and management actions taken by other independent instances of the management processes 76a-76b participating in the synchronization process 30.

Other embodiments are within the scope of the following claims.

What is claimed is:

1. A method comprising:
 querying a managed device to obtain an initial device state, wherein the managed device is a network switch including a remote management interface for allowing a plurality of remote management processes on a plurality of remote systems to remotely manage the network switch and wherein the initial device state of the managed device includes configuration parameter values;
 synchronizing the initial device state in the plurality of remote management processes, wherein synchronizing includes determining whether synchronization already exists between a managed device and a management process and establishing a synchronization if synchronization does not already exist, wherein determining includes comparing a sequence number identifying a current device state with a previously stored sequence number;
 detecting a change from the initial device state of the managed device; and
 in response to detecting a change from the initial device state of the managed device, maintaining a synchronized current device state between the managed device and the plurality of remote management processes, wherein the network switch sends updated device state information to the remote management processes, wherein the updated device state information includes different configuration parameter values from the configuration parameter values of the initial device state.

2. The method of claim 1 in which maintaining comprises:
 for each management process,
 storing a current device state in the management processes.

3. The method of claim 2 in which storing comprises:
 integrating an incremental device state change into information stored in a management process.

4. The method of claim 1 in which establishing comprises a device-dominant process.

5. The method of claim 4 in which the device-dominant process comprises:
 modifying information stored in a management process to match a current state of the managed device.

6. The method of claim 1 in which establishing comprises: a management process-dominant process.

7. The method of claim 6 in which the management process-dominant process comprises:
 modifying a current state of the managed device to match information stored in one of the management processes.

8. The method of claim 1 in which detecting comprises:
 receiving a device state change message from a managed device.

9. The method of claim 1 in which the change is responsive to a remote user command.

10. The method of claim 1 in which the change is responsive to a local user command.

11. The method of claim 1 in which the change is responsive to a command from one of the management processes.

12. A computer program product, stored in a non-transitory computer readable medium comprising instructions to cause a computer to:
 query a managed device to obtain an initial device state, wherein the managed device is a network switch including a remote management interface for allowing a plurality of remote management processes on a plurality of remote systems to remotely manage the network switch and wherein the initial device state of the managed device includes configuration parameter values;
 synchronize the initial device state in the plurality of remote management processes, wherein synchronize includes determine whether synchronization already exists between a managed device and a management process and establishing a synchronization if synchronization does not already exist, wherein determine includes compare a sequence number identifying a current device state with a previously stored sequence number;
 detect a change from the initial device state of the managed device; and
 in response to detecting a change from the initial device state of the managed device, maintain a synchronized current device state between the managed device and the plurality of remote management processes, wherein the network switch sends updated device state information to the remote management processes, wherein the updated device state information includes different configuration parameter values from the configuration parameter values of the initial device state.

13. The computer program product of claim 12 further comprising instructions to cause a computer to:
 determine whether a device state is already synchronized with stored information.

14. The computer program product of claim 13 further comprising instructions to cause a computer to:
 synchronize by modifying stored information in the management process to match a current state of a managed device.

15. The computer program product of claim 13 further comprising instructions to cause a computer to:
 synchronize by modifying a current state of a managed device to match stored information in a management processes.

16. A system for synchronizing device state of a managed device comprising:
 a management mechanism for managing a managed device, wherein the managed device is a network switch including a remote management interface for allowing a plurality of remote management processes on a plurality of remote systems to remotely manage the network switch and wherein the initial device state of the managed device includes configuration parameter values; and
 a feedback mechanism for querying the managed device to obtain an initial device state, for synchronizing the initial device state in the plurality of remote management processes, wherein synchronizing includes determining whether synchronization already exists between a managed device and a management process and establishing a synchronization if synchronization does not already exist, wherein determining includes comparing a sequence number identifying a current device state with a previously stored sequence number, for detecting a change from the initial device state of the managed device, and for, in response to detecting a change from the initial device state of the managed device, maintaining a synchronized current device state between the managed device and the plurality of remote management processes, wherein the network switch sends updated device state information to the remote management processes, wherein the updated device state information includes different configuration parameter values from the configuration parameter values of the initial device state.

* * * * *